(12) United States Patent
Kaitha

(10) Patent No.: US 11,921,745 B2
(45) Date of Patent: *Mar. 5, 2024

(54) PREVENTING DATA LOSS IN EVENT DRIVEN CONTINUOUS AVAILABILITY SYSTEMS

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/540,995

(22) Filed: Dec. 2, 2021

(65) Prior Publication Data
US 2022/0092080 A1 Mar. 24, 2022

Related U.S. Application Data

(63) Continuation of application No. 16/539,719, filed on Aug. 13, 2019, now Pat. No. 11,226,984.

(51) Int. Cl.
*G06F 16/27* (2019.01)

(52) U.S. Cl.
CPC .................. *G06F 16/27* (2019.01)

(58) Field of Classification Search
CPC ...................................................... G06F 16/27
See application file for complete search history.

(56) References Cited

U.S. PATENT DOCUMENTS

| 6,012,059 A | 1/2000 | Neimat et al. |
| 7,406,471 B1 | 7/2008 | Shankar et al. |
| 8,612,535 B2 | 12/2013 | da Fonseca Mendes et al. |
| 8,626,716 B1 * | 1/2014 | Katzer .................. G06F 16/27 707/646 |
| 8,688,749 B1 | 4/2014 | Ducott, III et al. |
| 8,838,534 B2 | 9/2014 | Fowler |
| 9,378,219 B1 | 6/2016 | Bono et al. |
| 9,875,266 B2 * | 1/2018 | Bourbonnais ........... G06F 16/27 |
| 10,282,248 B1 | 5/2019 | Gudka et al. |
| 10,362,131 B1 * | 7/2019 | Robbins .............. G06F 11/2041 |
| 10,685,358 B2 | 6/2020 | Coman et al. |
| 2003/0126133 A1 | 7/2003 | Dattatri et al. |
| 2005/0096928 A1 | 5/2005 | Ruggaber et al. |

(Continued)

FOREIGN PATENT DOCUMENTS

WO 2019004845 A1 1/2019

*Primary Examiner* — Marc S Somers
(74) *Attorney, Agent, or Firm* — Sterne, Kessler, Goldstein & Fox P.L.L.C.

(57) ABSTRACT

Described herein is a method, system, and non-transitory computer readable medium for preventing data loss from both producer and consumer systems in continuous availability event-driven applications. The process for preventing data loss may replicate events at the broker level, and selectively receive replica events at the consumer level to account for the case the originally sent event is not received, while conserving computer and network resources. Alternatively, events and replica events may be received in duplicate. In either mode of reception, machine-learning may be used for implementing algorithms which further help to conserve resources and aid in preventing further data loss.

20 Claims, 8 Drawing Sheets

(56) References Cited

U.S. PATENT DOCUMENTS

| | | |
|---|---|---|
| 2007/0143371 A1 | 6/2007 | Kottomtharayil |
| 2007/0162511 A1 | 7/2007 | Venkatesan et al. |
| 2008/0063154 A1 | 3/2008 | Tamari et al. |
| 2009/0328070 A1* | 12/2009 | Paknad ................ G06Q 10/06 719/318 |
| 2013/0159249 A1 | 6/2013 | Dewall et al. |
| 2013/0304694 A1 | 11/2013 | Barreto et al. |
| 2014/0082093 A1 | 3/2014 | Savage |
| 2014/0108260 A1 | 4/2014 | Poole et al. |
| 2014/0258241 A1 | 9/2014 | Chen et al. |
| 2016/0048408 A1* | 2/2016 | Madhu ................ H04L 47/783 718/1 |
| 2016/0147855 A1 | 5/2016 | Bhagat et al. |
| 2016/0212228 A1* | 7/2016 | Arkin ................ G06F 13/4265 |
| 2018/0095855 A1* | 4/2018 | Sanakkayala ....... G06F 11/1438 |
| 2018/0260819 A1* | 9/2018 | Bhatt .................... G06F 9/542 |
| 2019/0235974 A1 | 8/2019 | Pardon |
| 2021/0049185 A1 | 2/2021 | Kaitha |

\* cited by examiner

PREVENTING DATA LOSS IN EVENT DRIVEN CONTINUOUS AVAILABILITY SYSTEMS

CROSS-REFERENCE TO RELATED APPLICATIONS

The present application claims priority to U.S. patent application Ser. No. 16/539,719, entitled "PREVENTING DATA LOSS IN EVENT DRIVEN CONTINUOUS AVAILABILITY SYSTEMS," filed Aug. 13, 2019, the content of which is incorporated by reference herein in its entirety.

BACKGROUND

Continuous availability event driven applications often transact immense volumes of data, and as such are prone to data loss. These applications often utilize an event-driven approach with core datasets, which can be shared between different systems within the application, such as (orders, payments, accounts, end-users etc.) Companies implementing such an event driven pattern are present in almost every industry. Examples of such applications may include the internet banking services, streaming audio services, and streaming video services.

There are several reasons why preventing the loss of data is vitally important in these applications. Because the loss of data can interrupt a user's workflow, which can make for a sub-par user experience, preventing data loss is a critical element of performance utilized to achieve customer satisfaction. Additionally, data loss can lead to a breach in security, which can potentially compromise an entire application. This consequence is of importance to almost all industries in several capacities. For example, for the financial industry, a breach in security could mean the not only identity theft but also the remote laundering of money. For the audio/video services industries, potential loss of user-credentials could mean that a user is obtaining access to streaming content illegally without paying for it. Furthermore, data loss can lead to slower speeds in use for the application, if said data would need to be re-transmitted across systems, or consumer code would need to be deployed with configuration updates by pointing to replica data. If such a data loss were widespread, it could clog the system, leading to bottle-necking issues, and could slow the system down.

Aside from impact at both the business-end and the user-end of the application, legal issues arise from the loss of data as well. For example, if private or sensitive customer data is leaked, the business may be subject to legal liability. If business-sensitive data is leaked, the business can lose competitive advantage, or may be subject to shareholder lawsuits.

These types of residual disadvantages amplify at the scale at which many of these applications operate, and can have potentially disastrous consequences from a business operation perspective as well. For example, NETFLIX Inc. has streaming services subscribed to by over 100 million subscribers. A loss in data, even if individually small, when amplified by a large subscriber base at such a scale, substantially affects both the producer and consumer of the data.

As a result, there is a need for preventing data loss at both the producer side and the consumer side to successfully ensure a high rate of successful event transmission to the end-user, which is vitally important for the reasons outlined above.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Figure 1:
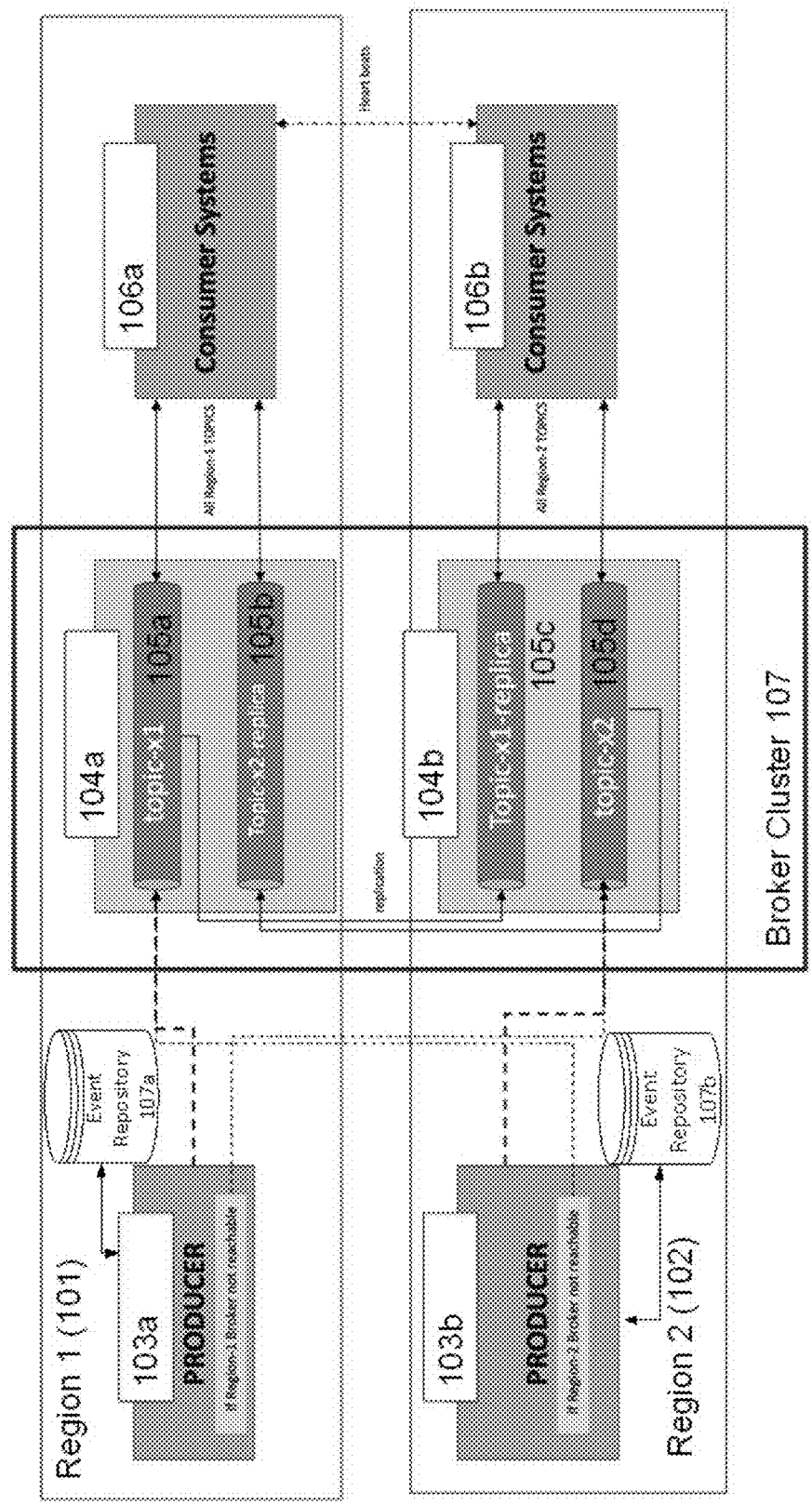
FIG. 1 illustrates a selective event processing mode according to an embodiment.

Continuous availability event driven applications often transmit events between internal systems, and from internal systems to external entities. In these applications, events are often routed from one internal system to another through the use of a broker. As a result, in order for the system to work cohesively, a plurality of systems must work together to send the internal event through the application.

At any point during said process, data may be lost. This loss of data can occur at the system where the event is initially accessed, the broker system, the system from where the event is sent to an external entity, and so on. The computing environment of the current disclosure may include computing resources distributed across various geographic regions. A continuously available event driven application may be represented by a producer system, a primary broker system, and a consumer system. As will be explained in more detail, infra, the producer system may produce events by accessing an event repository from within the application to send towards an end-user, and may facilitate said sending.

The embodiments described herein avoid data loss on both the producer and consumer sides. For the producer side, the embodiments described herein describe a process of sending said event, such that permission to send is first requested from the primary broker system, and if the primary broker system is not available, then a failover broker is used. For the consumer side, data loss is avoided in a two-tier approach, offering options to an administrator of the application to use a duplicate event processing mode, or a selective event processing mode.

FIGS. 1-3 and FIG. 8 illustrate different embodiments of event processing modes in the instant disclosure. In these embodiments, there may be a plurality of regions present, such as region 1 (101), and region 2 (102) in FIG. 1. Each such region comprises a respective producer system (such as first producer system 103*a* or second producer system 103*b*), a respective primary broker system (such as first primary broker system 104*a* or second primary broker system 104*b*), and a respective consumer system (such as first consumer system 106*a* or second consumer system 106*b*). In an embodiment, each such region is a geographical region. For example, when a producer system, broker system, and consumer system are present in a common geographical radius, such as, for example, the same room, the same university campus, or even the same state or country, the region may comprise a geographical region. In an additional embodiment, each such region is associated other than through geography. For example, a producer system, broker system, and consumer system may be present in different geographic locations, but still may be linked together, by, for example, via a wireless network, VPN, wired network, etc, and this may comprise a non-geographical region. The broker cluster 107 may include the respective primary broker systems of each region of the plurality of regions (for example, in FIG. 8). Alternately, the broker cluster 107 may include the respective primary broker systems of selected regions of the plurality of regions (in the embodiment of FIG. 8, it is possible that only Region 1 and Region 2 may be included in the broker cluster 107).

Figure 3:
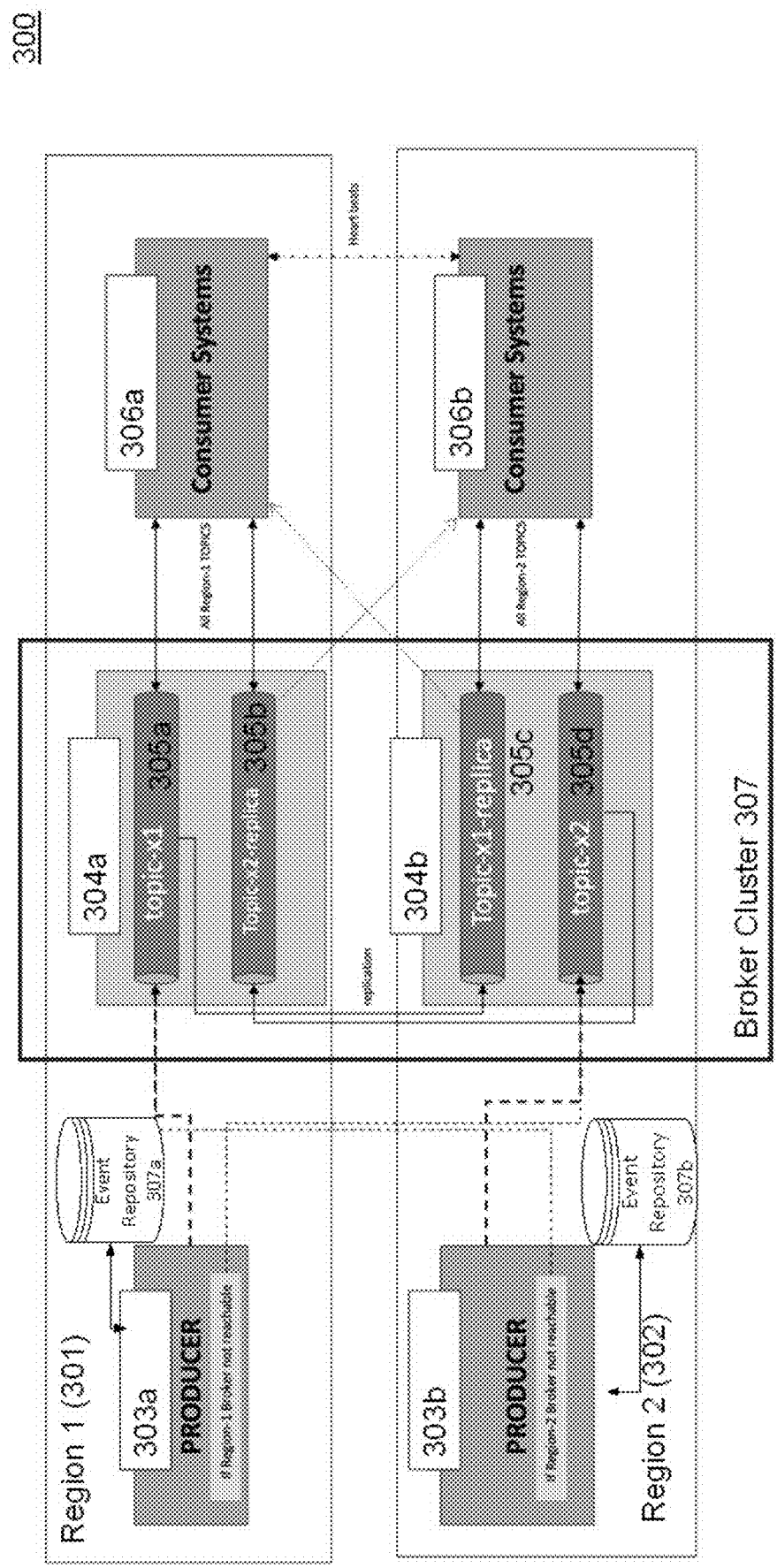
FIG. 3 illustrates a selective event processing mode when a cluster broker is partially operable.
Figure 4:
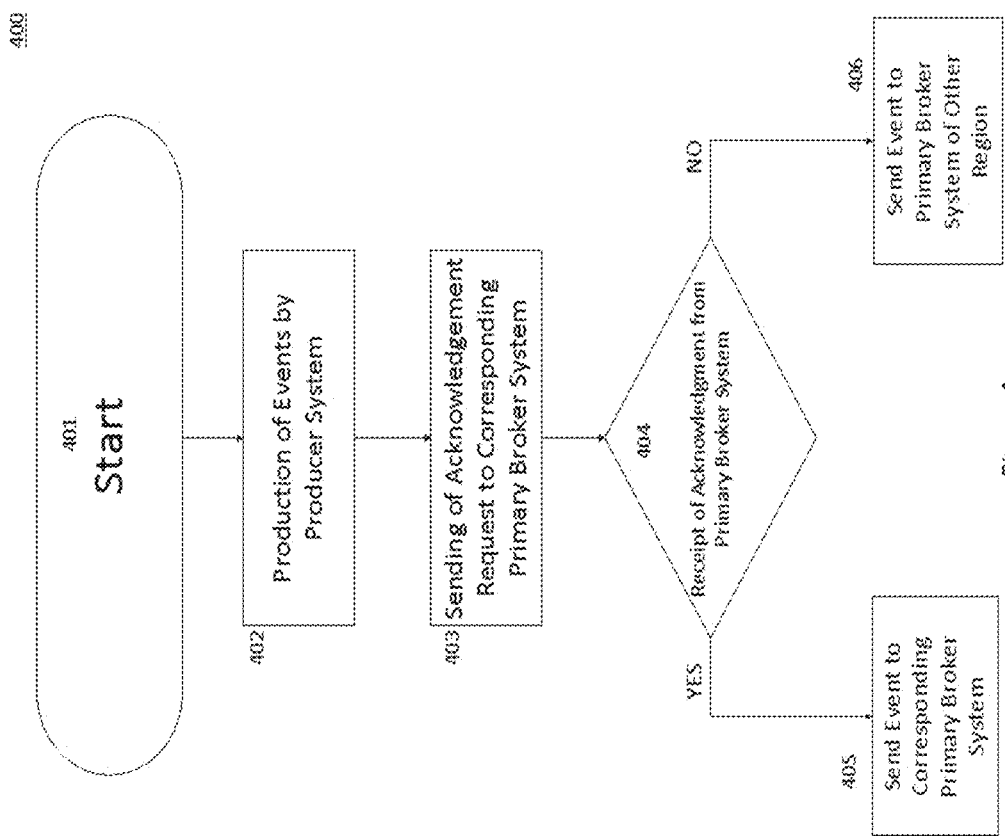
FIG. 4 is a flowchart illustrating the decision process undertaken by the producer system in sending an event, according to an embodiment.

The flowchart disclosed in FIG. 4 describes the initial processing of events in the embodiments of continuous event driven applications in the present disclosure, and is applicable to all embodiments disclosed herein. A brief description of its application to FIG. 1 is made, with the understanding that it can analogously apply to the embodiments shown in FIGS. 2-3 and FIG. 8, or any combination of these embodiments. First, in step 402 of FIG. 4, the first producer systems (103*a* and 103*b*) shown in FIG. 1 may produce events, which are eventually to be sent to end-users through consumer systems (106*a* and 106*b*), which act as gateway communication modules, sending the event from the internal application to the external end-user.

When the first producer systems produce events in step 402, they may do so by accessing event repositories (107*a* and 107*b* as shown in FIG. 1). These repositories act as event stores, wherein when a necessary condition arises requiring an event to be sent to an end-user or other entity external to the application, then the producer 103*a* is sent an internal message from the repository, and accesses the event to be sent forward. Events accessed may include email messages or notifications, media such as image files, word-processing files, video files, and/or files pertaining to a service offered by an administrator of the continuous availability event driven system 100 (e.g. bank documents for a banking service, streaming protocol or packets for a streaming service, etc.). The communication system (e.g. consumer system of a particular region) which would be used for sending the event to the end-user or other entity external to the application may encoded in the internal message sent from the repository, or in the metadata of the actual event itself.

Figure 6:
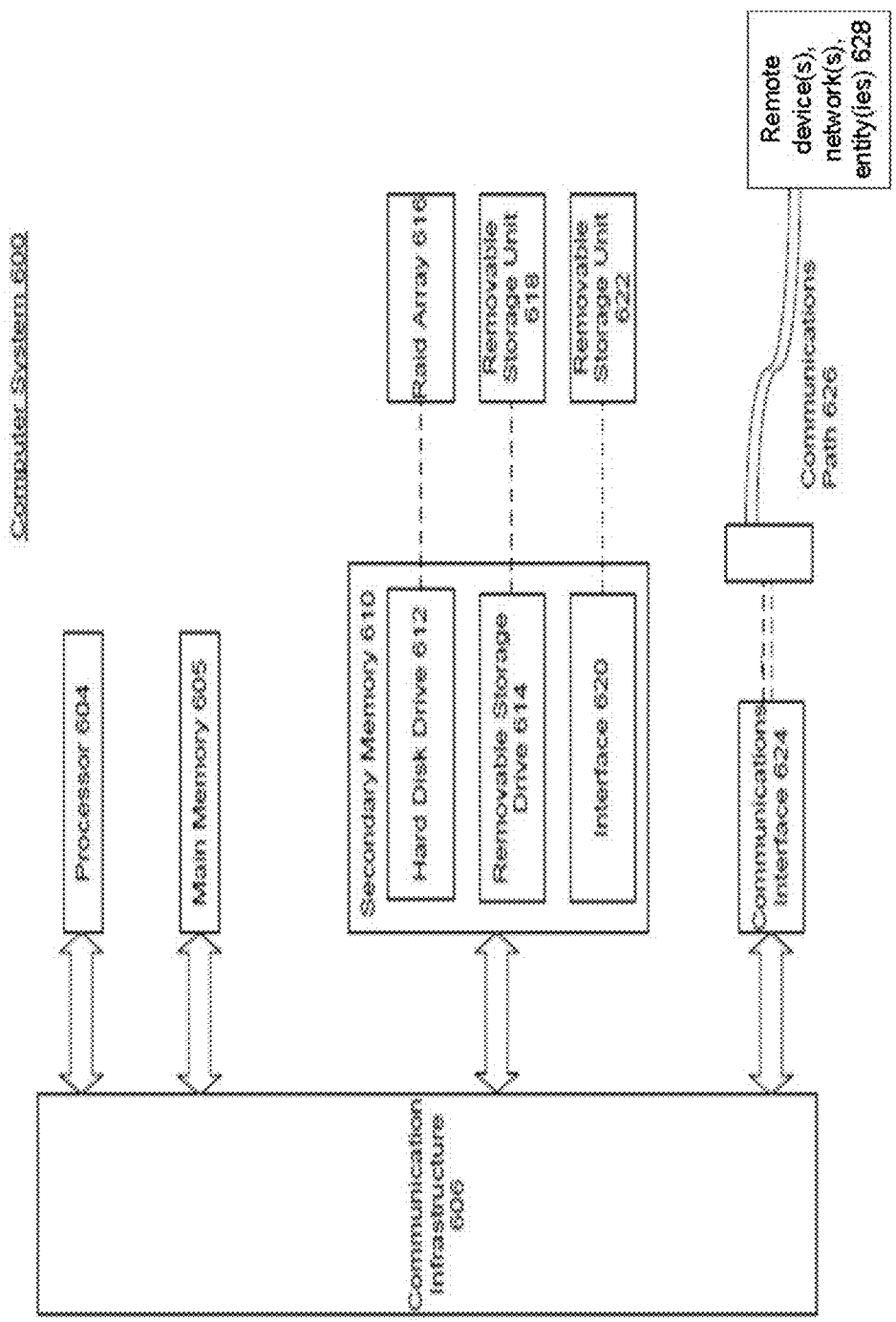
FIG. 6 is a block diagram of example components of the underlying structure of any of the systems presented in the following embodiments.

The event repository (107*a* or 107*b* as shown in FIG. 1) may comprise one or more separate computer systems such as the computer system 600, or may be present on an existing computer system 600 which implements other systems of the continuous event driven application such as the producer, broker, and/or consumer systems. The underlying structure of such a computer system 600, shown in FIG. 6, can implement a database and the sending of messages indicating an event to be sent to the producer system (103*a* or 103*b*). Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process events when events are to be processed in a mass quantity, making it particularly effective in resource-intensive applications. The GPU may have a parallel structure that is efficient for parallel processing of large blocks of data, such as data common to computer graphics applications, images, videos, word-processing documents, PDF files, and the like, any of which can comprise event data as described above.

Computer system 600 can also include a main or primary memory 608, such as random access memory (RAM). Main memory 608 can include one or more levels of cache (including secondary cache).

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending messages about events in the event repository (e.g. 107*a* in region 1 in FIG. 1) to the producer system 103*a*. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 701 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the database of the event repository (107*a* or 107*b*), as an example approach, the computer system 600 may use an in-memory database, which may be stored in the primary memory 608 of the computer system 600, or it may use a database in secondary memory 610, which may be stored e.g., in a file on a hard drive in a Raid array 616, on an EPROM chip 620, or other type of secondary memory 610, etc. Messages sent from the event repository (107*a* or 107*b*) may be sent through the communication infrastructure 606 to the producer system (103*a* or 103*b* in FIG. 1).

Furthermore, each of the producer systems, broker systems, and consumer systems in a region (103*a*, 104*a*, and 106*a* in region 1 in FIG. 1), may each be implemented using separate computer systems 600. Alternatively, all the producer systems, broker systems, and consumer systems, for each region, may all be present within one computer system 600, or may be present together or alone in any combination in separate computer systems 600. Additionally, said systems for multiple regions may be grouped together in a single computer system 600, or may be split across multiple systems 600 by region. In addition, the event repository (107*a* in region 1 for FIG. 1) may also be included together with any of the producer system, broker system, and consumer system, for a region, in any combination, as part of a joint computer system 600, or as an isolated event repository computer system 600.

If the event repository (107*a* in region 1 for FIG. 1) is implemented as a separate system 600, it may send messages regarding the processing of events through the communication or network interface 624, wherein the producer system, broker system, and consumer system may comprise entities 628 present on an internal or external network (individually or collectively), which may be accessed through communications path 626. Alternately, if any of the systems are present along with the event repository jointly in a computer system 600, said computer system 600 may implement the database using the communication infrastructure 606 to communicate to the other systems and send messages regarding the processing of events.

Figure 7:
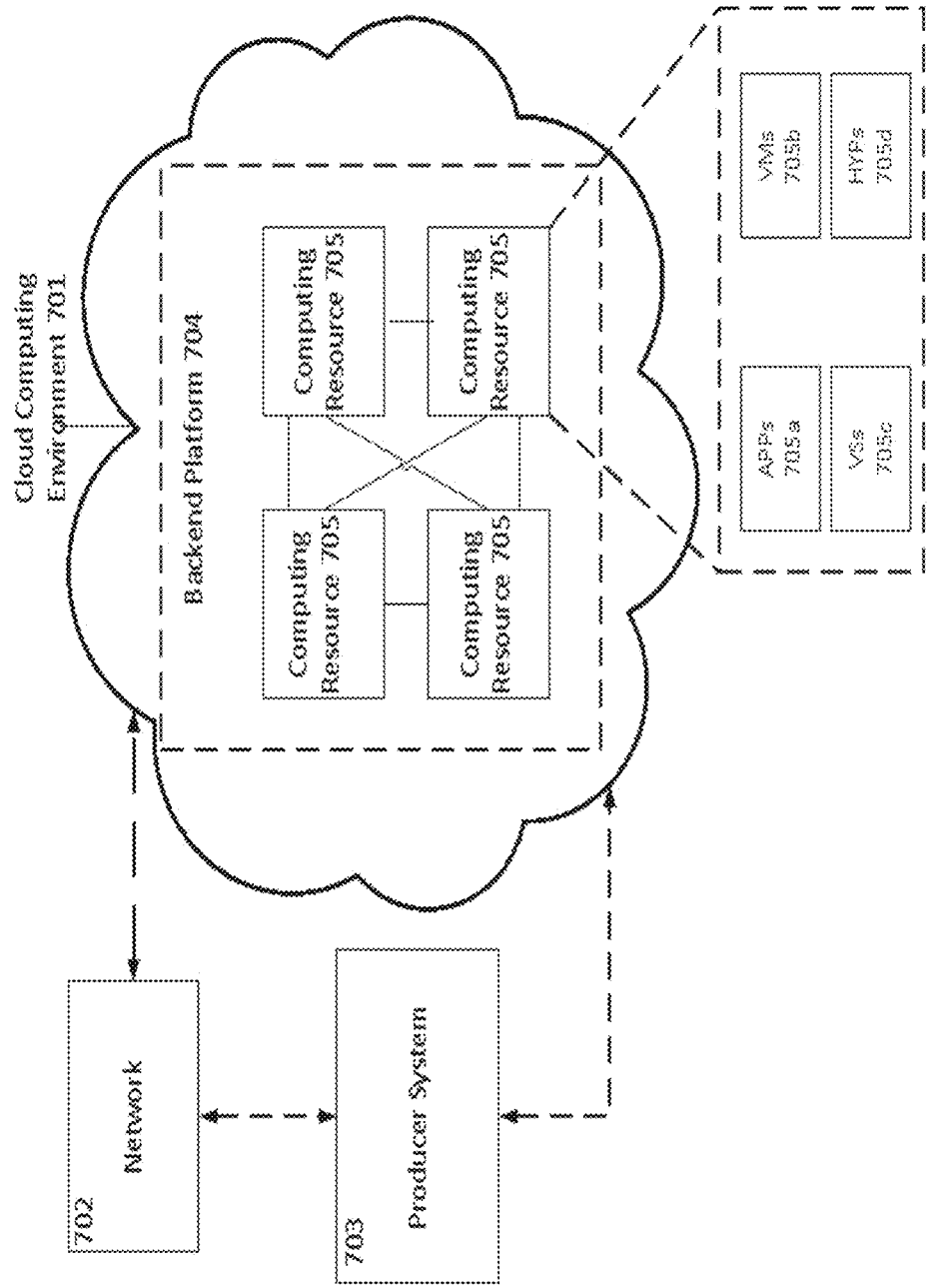
FIG. 7 is a block diagram of an example where a cloud computing environment may be accessed by the producer system, according to an embodiment.

Further alternately, the event repository (e.g. 107*a* in region 1 in FIG. 1) may be comprised as a backend platform 704, which is hosted in a cloud computing environment 701, and is accessed by the producer system as shown in FIG. 7, which is a block diagram of an example environment 700 in which systems and/or methods described herein may be implemented. In this case, the producer system may comprise a computer system 600, which may access the event repository by the communication or network interface 624, wherein a network gateway 702 may comprise a remote entity 628 accessed by the communications path 626 of the producer system (e.g. 103*a* in FIG. 1, corresponding to 703 in FIG. 7). Alternately, the computing cloud environment 701 itself may correspond a remote entity 628 in FIG. 6, and may be accessed directly by the producer system through a communications path 626, for example through an application protocol interface (API) (both options are shown in FIG. 7, wherein the flow path above the producer system 703 uses a network gateway 702, and the flow path below the producer system 703 connects directly to the cloud computing environment 701, both shown using dashed bi-directional lines).

The environment 700 may include the producer system 703, a backend platform 704, a cloud computing environment 701, and a network 702. The devices of the environment 700 may be connected through wired connections, wireless connections, or a combination of wired and wireless connections.

In an example embodiment, one or more portions of the network 702 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The producer system 703 may comprise a computer system 600. Alternatively, the producer system itself may be a computing resource 705 (explained infra) within the cloud computing environment 701.

The backend platform 704 may include a server or a group of servers. In an embodiment, the backend platform 704 may be hosted in a cloud computing environment 701. It may be appreciated that the backend platform 704 may not be cloud-based, or may be partially cloud-based.

The cloud computing environment 701 includes an environment that delivers computing as a service, whereby shared resources, services, etc. may be provided to the producer system 703 and/or the backend platform 704. The cloud computing environment 701 may provide computation, software, data access, storage, and/or other services that do not require end-user knowledge of a physical location and configuration of a system and/or a device that delivers the services. For example, the producer system 703 may receive events hosted on a database within computing resources 705 within the backend platform 704, through an application protocol interface (API). The cloud computing environment 701 may include computing resources 705.

Each computing resource 705 includes one or more personal computers, workstations, computers, server devices, or other types of computation and/or communication devices of the type such as computer system 600 described above. The computing resource(s) 705 may host the backend platform 315. The cloud computing resources may include compute instances executing in the cloud computing resources 705. The cloud computing resources 705 may communicate with other cloud computing resources 705 via wired connections, wireless connections, or a combination of wired or wireless connections.

Computing resources 705 may include a group of cloud resources, such as one or more applications ("APPs") 705*a*, one or more virtual machines ("VMs") 705*b*, virtualized storage ("VS") 705*c*, and one or more hypervisors ("HYPs") 705*d*.

Application 705*a* may include one or more software applications that may be provided to or accessed by a computer system 600. In an embodiment, the continuous event driven application's subsystems in each region, comprising the producer system, primary broker system, and consumer system (103*a*, 103*a*, and 106*a* in region 1 as shown in FIG. 1) may execute locally on a computer system 600 or several computer systems 600 in various combinations. Alternatively, all of the application's subsystems in a region may be executed as APPs 705*a*, which may provide a consolidated environment and eliminate a need to install and execute software applications computer systems 600. The application 705*a* may include software associated with backend platform 704 and/or any other software configured to be provided across the cloud computing environment 701. The application 705*a* may send/receive information from one or more other applications 705*a*, via one or more of the virtual machines 705*b*. Computing resources 705 may be able to access each other's applications 705*a* through virtual machines 705*b*, in this manner.

Virtual machine 705*b* may include a software implementation of a machine (e.g., a computer) that executes programs like a physical machine. Virtual machine 705*b* may be either a system virtual machine or a process virtual machine, depending upon the use and degree of correspondence to any real machine by virtual machine 705*g*. A system virtual machine may provide a complete system platform that supports execution of a complete operating system (OS). A process virtual machine may execute a single program and may support a single process. The virtual machine 705*b* may execute on behalf of a user (e.g., the administrator of the producer system 703) and/or on behalf of one or more other backend platforms 704, and may manage infrastructure of cloud computing environment 701, such as data management, synchronization, or long duration data transfers, and accessing the database of the event repository (e.g. 107*a* in region 1 in FIG. 1).

Virtualized storage 705*c* may include one or more storage systems and/or one or more devices that use virtualization techniques within the storage systems or devices of computing resource 705*c*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the producer system 703 flexibility in how they manage storage for events designated for different end users. File virtualization may eliminate dependencies between data accessed at a file level and location where files are physically stored. This manner of block and file virtualization may enable optimization of storage use, server consolidation, and/or performance of non-disruptive file migrations.

Hypervisor 705*d* may provide hardware virtualization techniques that allow multiple operations systems (e.g., "guest operating systems") to execute concurrently on a host computer, such as computing resource 705, which may comprise a computing system of the type of computing system 600. Hypervisor 705*d* may present a virtual operating platform to the guest operating systems, and may manage multiple instances of a variety of operating systems as these "guest operating systems," which may share virtualized hardware resource, such as RAM, which may for instance access the database of the event repository (107*a* in FIG. 1), if, for example, the event repository is implemented using an in-memory database. Alternately, if the event repository is implemented using a database using secondary memory, this may be accessed using virtualized storage 705*c*, or on physical storage, such as the hard disk drive 612, of a computing resource 705 of the type of computing system as computing system 600. In all embodiments heretofore described, using a combination of RAM and secondary memory to access the database, such that a portion of the database may be in-memory and a portion of the database stored in files, is also envisioned.

As described above, the cloud computing environment 701 may include multiple different cloud computing accounts which may utilize different cloud computing resources 705. The listener, rules engine, and first monitoring service instantiated by a cloud computing account may be hosted by the cloud computing environment 701, and may be executed one or more of the cloud computing resources 705. In addition, said resources may include an event monitoring engine for the event repository (107*a* in FIG. 1), wherein, when an event is to be sent to an external entity, a message may be relayed to the producer system 703. Such a message may include the communication system (e.g. consumer system of a particular region) for which the event is designated, as described supra, or alternatively the communication system for which the event is designated may be encoded in the metadata of the event itself. These monitoring services, rules engines, collection services, and API gateways, instantiated by the central cloud computing account may be hosted by the cloud computing environment 701 and may be executed by one or more of the cloud computing resources 705.

Each of the cloud computing resources 705 may be related to another cloud computing resource 705 (e.g., parent-child relationship). The system for monitoring events in the database of the event repository (e.g., 107*a* in FIG. 1) may capture the relationships between the different computer resources 705, and may comprise a joint parallel computing unit of several computing resources 705.

For the flowchart shown in FIG. 4, as analogously applicable to FIGS. 1-3 and FIG. 8, when the first producer system 103*a* produces events, the event monitoring engine monitors for when an event is to be sent to the consumer system (106*a*) of a particular region (e.g. region 1) in step 402, and also performs the sending of a corresponding message to alert the producer system 103*a*. This event monitoring engine may be executed within the producer system 103*a* itself, where this may be in the form of software stored in main memory 605 or secondary memory 610 on a computer system 600, or if the producer system 103*a* is in the form of a computing resource 705 as part of a cloud computing environment 701, the event monitoring engine may be stored within and executed from physical resources such as main memory or secondary memory of the computing resource 705, or on VMs 705*b* or VSs 705*c* of a computing resource 705. Alternately, the monitoring engine may be part of a backend platform 704 comprising the event repository in a cloud computing environment 701, which may be separate to and accessed by the producer system 103*a* (corresponding to 703 in FIG. 7), as shown in FIG. 7, wherein messages may be sent form the monitoring engine to the producer system either directly or through a network gateway 702, and may be accessed via an API as described above.

After said events are accessed and produced by the producer system in step 402 of the flowchart shown in FIG. 4, the producer system in any region in the embodiments of FIGS. 1-3 and FIG. 8 (e.g. producer system 103*a* in region 1 in FIG. 1) sends an acknowledgement request to the corresponding primary broker system (first primary broker system 104*a* in region 1 in FIG. 1). At step 403, the producer system may use a listener event or the like to receive a response from the primary broker system, in the form of a receipt of acknowledgement response, or a lack of receipt of acknowledgment response.

In particular, the producer system may wait to receive a receipt of acknowledgement from the corresponding primary broker system for a predetermined threshold of time. When a receipt of acknowledgement response is received within this predetermined threshold, the producer system may then send the accessed event forward to the corresponding broker system, as shown in step 405. Conversely, when the acknowledgement response is not received within this predetermined threshold, this may constitute a lack of acknowledgement response, and the producer system may then send the accessed event to a primary broker system of another region (104*b* in region 2 in FIG. 1), otherwise known as a failover broker, as shown in step 406. This action of sending the accessed event to a failover broker is also shown in FIG. 1, wherein within the first producer system 103*a*, the logic "If Region-1 Broker not reachable" is shown, wherein when the process reaches step 406, then as shown by the dashed line extending from this logic to second primary broker system 104*b* of Region 2 (102), the producer system 103*a* sends the event to second primary broker system 104*b* instead (meaning if this were to occur, then event "topic-x1" shown in first primary broker system 104*a*, would instead be present in second primary broker system 104*b*).

In using the failover broker in the described manner, data loss pertaining to events sent by the producer to the broker is prevented. For even further prevention of data loss, the process of using a failover broker can be replicated across three regions, as shown e.g., in FIG. 8, wherein if a single broker is not reachable then two other brokers out of the three primary broker systems in broker cluster 807 can act as a backup to receive an event being sent by the producer system of any single region. Similarly, such a process of using a failover broker can be replicated for any n number of regions in such a continuous event driven application. To conserve resources, however, and prevent waste, the administrator of the continuous availability event driven application can limit the number of primary broker systems in the broker cluster 807 to fewer than the total number of regions, where not every region is required to have its own corresponding primary broker system (for example, if 99 backup broker systems may not be needed in the broker cluster of a 100 region system, the number of primary broker systems in the cluster may be adjusted to any of 1-100 broker systems as desired, and several regions may share a primary broker system).

The embodiment of FIG. 1 is further explained. After the event is sent to the primary broker system 104*a*, a replication process is run which replicates the event across all of the primary broker systems in the cluster. For example as shown in FIG. 1, the event "topic-x1," sent by first producer system 103*a* to first primary broker system 104*a*, is replicated as "topic-x1-replica" in second primary broker system 104*b*, and the event "topic-x2," sent by second producer system 103*b* to second primary broker system 104*b*, is replicated as "topic-x2-replica" in first primary broker system 104*a*. As a result, a replica of the event originally sent by the first producer system 104*a*, for example is denoted as a replica ("replica" in "topic-x1-replica") within the metadata of the event, designated for the first region ("x1" in "topic-x1-replica"). Alternately, the fact that the event is a replica and designated for the first region may also be indicated in a message to or originating within the primary broker system 104*a*, which may be sent forward to the designated consumer system of the region 106*a*, possibly based on the outcome of a decision process (described infra).

As described in step 406 in flowchart 4, this situation may also be reversed, when e.g., the first producer system 103*a* receives a lack of acknowledgement response from first primary broker system 104*a*, and instead sends event "topic-x1" to the second primary broker system 104*b*, wherefrom it may be replicated as "topic-x1-replica" in first primary broker system 104*a*. Similarly, as described in step 406, if the second producer system 103*b* receives a lack of acknowledgement response from second primary broker system 104*b*, it will send event "topic-x2" to the first primary broker system 104*a*, wherefrom the event may be replicated as "topic-x2-replica" in second primary broker system 104*b*, which would be the reverse of the situation shown in FIG. 1. The same logic also applies to the embodiments in FIGS. 2-3 and FIG. 8.

The replication process and associated message/metadata generating process may be software executed from and stored on any of the producer system, primary broker system, or consumer system of each region, or alternately may be executed as an application 705*a* stored within a computing resource 705*a* within the backend platform 704 of the cloud computing environment 701, wherein such a process may for example be called as a function through the API described above from a producer system of a region 703, or alternately, from a corresponding primary broker system or a corresponding consumer system from a region. In this manner, for example, if the primary broker system 104*a* called the replication to be performed as a process utilizing the cloud computing environment 701, resources may be conserved within the primary broker system 104*a* itself, wherein said resources may be used in processing more received events, and resulting in less data loss overall.

After the replication process is conducted, a decision process may take place. The decision process may be software executed from and stored on any of the producer system, primary broker system, or consumer system of each region, or alternately may be executed from and stored as an application 705*a* within a computing resource 705*a* within the backend platform 704 of the cloud computing environment 701, wherein such a process may for example be called as a function through the API described above from a producer system of a region 703, or alternately, from a corresponding primary broker system or a corresponding consumer system from a region. The decision process decides, based on additional or considerations or rules separate from the event monitoring engine described above, whether the event needs to be finally sent to an end-user or external entity from the communication system (e.g. the first consumer system 106*a*), or whether the event should be sent back to the producer system (e.g. 103*a*) or event repository (e.g. 107*a*) for processing on a later date (e.g. if a customer is due for a payment on an account for a banking service, can the notification be sent later or should it be sent immediately), wherein said information may be encoded in a message or event metadata, which can be sent to, accessed by, and interpreted by the producer system (e.g. 103*a*) or event repository (107*a*). Based on the decision, the primary broker system may send a message to the consumer system designated by the event (e.g. 106*a* in region 1 for 'topic-x1', wherein the x1 indicates metadata signifying that the event is designated for processing by the consumer system of region 1, and similarly may include replica metadata for replica events, as described above) to process the data from the event, wherein information about the event (e.g. 'topic-x1' or 'topic-x1-replica') may be contained in event metadata or in the message itself.

Alternately, there may also be an embodiment with no further decision process after the replication process, and after the replication process the primary broker system (e.g. 104*a*) may send a message to the consumer system designated by the event to process the data from the event.

The operation of the consumer systems of regions, such as the first consumer system 106*a* and the second consumer system 106*b*, will now be described. The consumer systems, such as 106*a* and 106*b*, are continuously checking for messages from all primary broker systems in the broker cluster 107. This may occur at a predetermined periodic time interval (e.g. in the millisecond range, or as desired), or at irregular time intervals. Simultaneously, there is a heartbeat communication background process occurring, including while messages to process data for events sent from the primary broker system are received by the consumer system. This process includes consumer systems from at least two regions (e.g. 106*a* and 106*b*) in the application 100, wherein the two systems may maintain communication with each other through the sending and receiving of data packets. Such communication may be checked at an interval periodically, or at irregular intervals as desired by the administrator of the application. In a preferred embodiment such communication is maintained and checked at a regular interval on the millisecond scale. In this manner, when regular communication between the at least two consumer systems is being maintained, then any of said consumer systems (e.g. 106*a*) does not process data from replica events, essentially ignoring any message received from a primary broker system requesting such an action. Conversely, when it is detected that data packets are not being received or sent from a particular consumer system, replica events are then processed for both systems. In this manner, for example, if consumer system 106*b* has a power outage, or somehow becomes disconnected from the rest of region 2 (102), both the 'topic-x1' event as well as the 'topic-x2-replica' event (which is a replica of the 'topic-x2' event in primary broker system 104*b*) may be processed by consumer system 106*a*, which prevents data loss of the 'topic-x2' event by the application 100. In an embodiment, the detection and decision-making process may take place within the producer system, such as 103*a* or 103*b*, to conserve resources on the consumer system 106*a* for bulk processing of events, wherein the producer system 103*a* or 103*b* may also be a cloud computing resource 705 as described above. In said embodiment, wherein the producer system is a cloud computing resource 705, the output from the sending and receiving of data packets may be relayed to the producer system 103*a* or 103*b*, wherein the producer system 103*a* or 103*b* may send a message to the consumer system 106*a* or 106*b* to switch mode of operation from processing only data from events originally sent, to also processing replica events.

Figure 5:
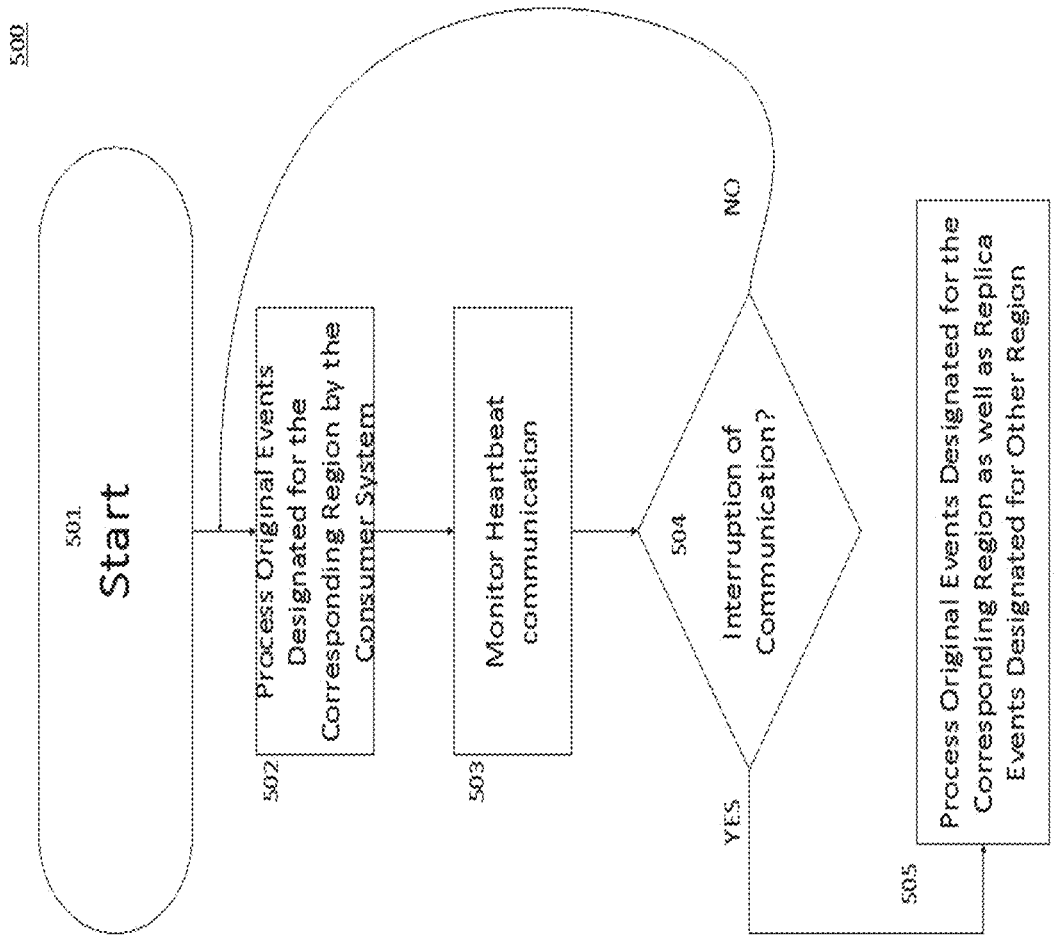
FIG. 5 is a flowchart illustrating a process undertaken by the consumer system in receiving events, according to an embodiment.

The process and structure of FIG. 1 are analogous to that shown in FIG. 3. However, FIG. 3 accounts for the possibility, where, after events are sent from the producer systems 303*a* and 303*b* of the first and second regions, respectively, to the primary broker systems 304*a* and 304*b* in the broker cluster 307, one of the primary broker systems may have a power outage or have communication problems such that they become disconnected from their respective region (301/302), and may not be accessible by consumer systems 306*a* or 306*b*. This process is described in the flow chart shown on FIG. 5. To account for the possibility that the primary broker systems may become disconnected from their respective region, regular heartbeat communication between the at least two consumer systems is monitored (step 503 in FIG. 5). When such communication is maintained (NO in step 504 in FIG. 5), then the consumer systems process originally sent events designated for the corresponding region of consumer systems (step 502 in FIG. 5) as well as replica events which may be designated for the same region as the consumer system (e.g. consumer system 306*a* would process data from 'topic-x1-replica' 305*c* to account for the possibility of primary broker system 304*a* shutting down, while consumer system 306*b* would process data from 'topic-x2-replica' 305*b* to account for the possibility of primary broker system 304*b* shutting down). When heartbeat communication is interrupted (e.g. between 306*a* and 306*b*, corresponding to YES in step 504 in FIG. 5), the consumer systems, as in FIG. 1, may process original events and replica events designated for the corresponding region of the consumer system, as well as replica events designated for other regions (corresponding to step 505 in FIG. 5).

To further conserve resources, the event processing mode of FIG. 1 may be used by the application 300 in FIG. 3 initially. Then, an outage or communication problem may be detected between the primary broker systems, by maintaining a heartbeat communication between the primary broker systems (e.g. 304*a* and 304*b*) similar to that described between the at least two consumer systems above. Alternately, detection of an outage or communication problem may also occur by sending a message to a consumer system of a corresponding region when a system failure has been detected, such that the consumer system is able to then switch to the event processing mode shown in FIG. 3, where replica events designated for the same region as the consumer system may be processed.

Another means for detecting an outage or communication problem between the primary broker systems and the consumer system, would be to encode the failure of the broker system 304a or 304b in the metadata of the event itself, such that when the replication occurs at the primary system broker layer, the replica event may hold information metadata about the broker of the original event having communication or power problems. This metadata may be measured from memory, or from a CPU, etc. in the form of data packet loss records, latency, error logs such (including filesystem errors, disk errors, out of memory errors, etc.), saturation queue length, swap usage, and the like. Then, when the consumer system (306a/306b) has access to metadata from the replica event, it may process data from that replica event only if it is determined that the broker of the original event is having communication/power or other problems.

Figure 2:
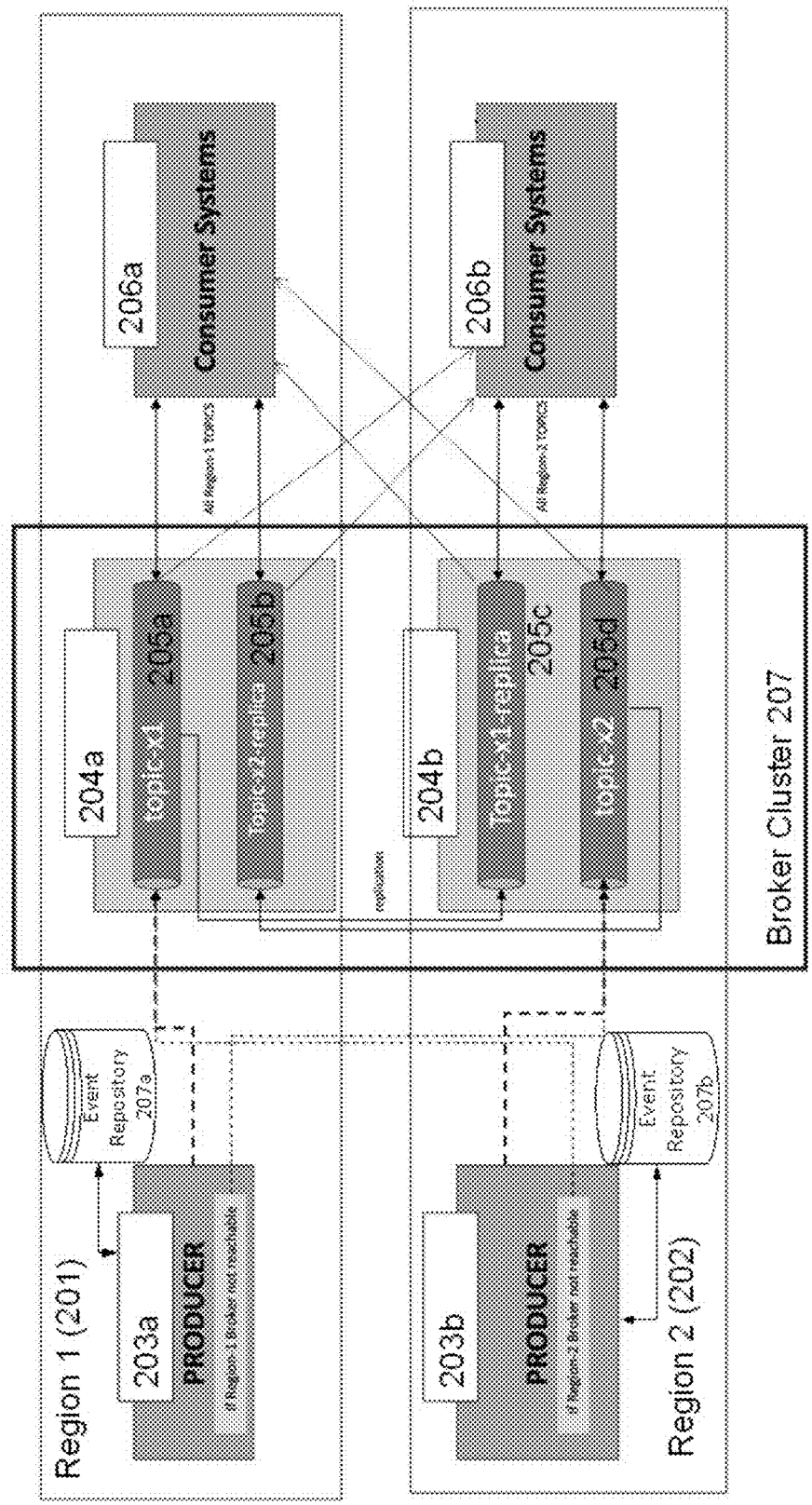
FIG. 2 illustrates a duplicate event processing mode according to an embodiment.

Finally, to account for further outages, a duplicate processing mode may be used as shown in FIG. 2. The process and structure of FIG. 1 are analogous to that shown in FIG. 2, except that no heartbeat communication is maintained. As shown in FIG. 2, the consumer systems, such as 206a and 206b, process all events and replica events designated for the corresponding region of the consumer system as well as for other regions. In this way, if 204a crashed or had a system outage, and the producer systems 203a as well as 203b were not able to communicate properly with 204a, meaning topic-x1 as well as topic-x2 would be sent to 204b, and subsequently the consumer system 206b crashed, the consumer system 206a would still receive both topic-x1 and topic-x2, which it would not do in the processing modes outlined in FIGS. 1 and 3.

In all embodiments of FIGS. 1-3 and FIG. 8, the producer system, primary broker system, and consumer system for a particular region may maintain a log of messages, such that when there is an outage, computer failure, or communication problem, the log may be revisited upon the problem being fixed, wherein the last event index may be successfully found, and the system can minimize start-up time to return to processing events.

Figure 8:
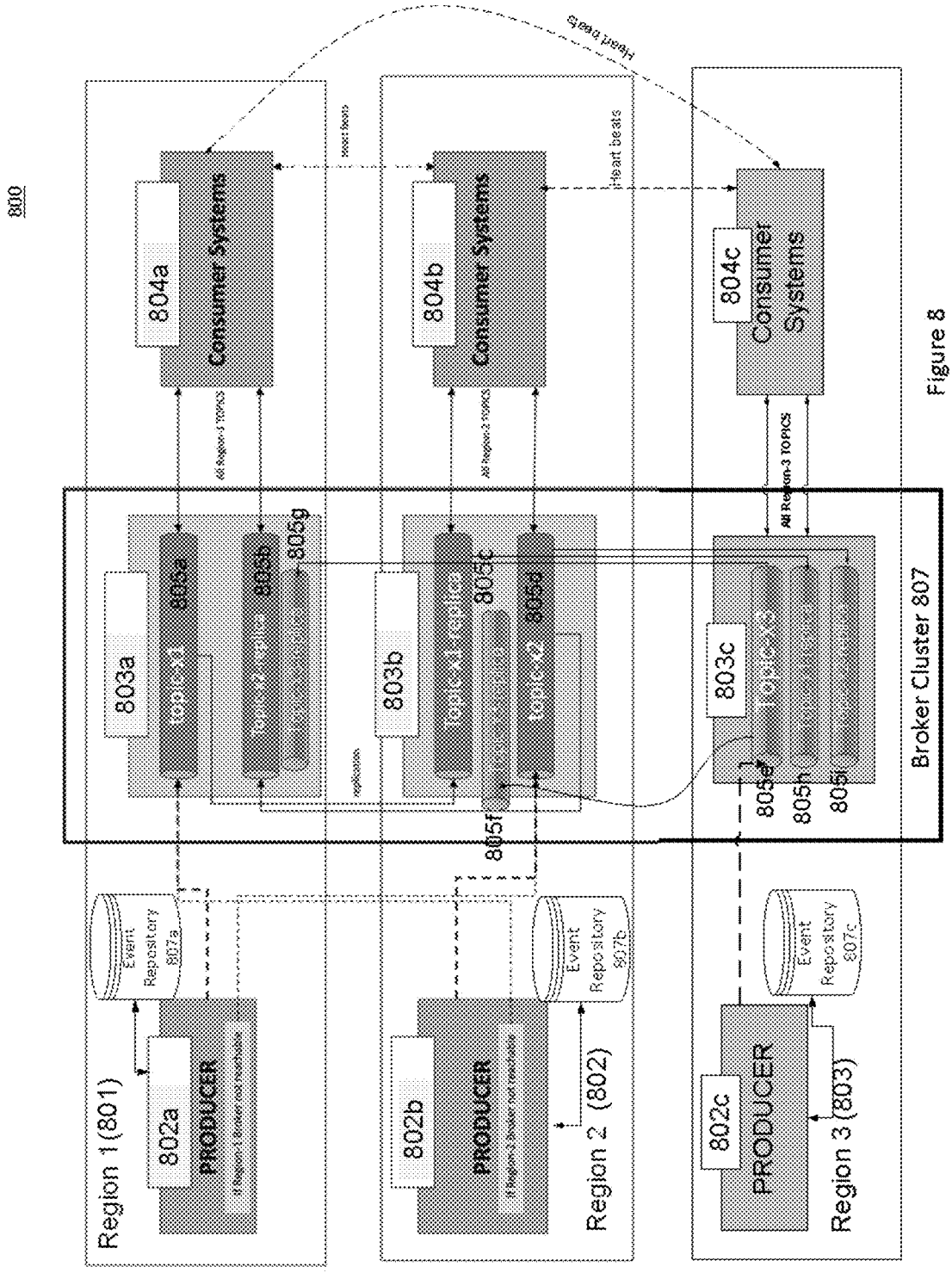
FIG. 8 illustrates a selective event processing mode according to an embodiment with three regions.

FIG. 8 shows a mode where more than three regions may be part of a continuous event-driven application 800. In this mode, heartbeat communication may be maintained as indicated above not only between the consumer systems of Region 1 (801) and Region 2 (802), but also between Region 2 (802) and Region 3 (803), as well as between Region 1 (801) and Region 3 (803) as shown in FIG. 8. In this manner, if any interruption is detected between the consumer systems of any two of these regions, then replica events can be processed, preventing data loss from any single region. The plurality of heartbeat communications as shown in FIG. 8 can also be used for load balancing. For example, if consumer 804c has a power outage, heartbeat communication interruptions will be detected not only by 804b, but also by 804a, since both maintain heartbeat communication with 804c. Then, in this case, since 804a and 804b maintain their own heartbeat communication, data packets sent back and forth may contain load balancing information in processing replica events designated for Region 3. Alternately, such load processing may take place in an external system such as the respective producer systems of the region (802a/802b/802c in application 800), or even a cloud computing environment 701 as described above, as external computing resources 705 could be dedicated to this task, for example, in the form of an application 705a.

The modes of operation encompassed by FIGS. 1-3 and FIG. 8 are envisioned to be easily switchable, meaning that an administrator of a continuous availability event driven application may be able to take a tiered processing approach. For example, for a banking service, if transactions over a certain amount were to be processed, the duplicate data processing mode described in FIG. 2 may be used in critical applications, to avoid data loss at any cost. The mode of FIG. 2 is a non-lean mode, as it consumes the most resources, but also ensures maximal protection of event data. For other applications involving, e.g., a mere reminder notification, etc., which may be denoted as a non-critical application, the processing mode described in FIG. 1 may be used as a lean mode, wherein a lean mode uses less resources and can therefore process more events per a given amount of computing resources. As described above, FIG. 3 may be used as an intermediate mode between the modes of FIG. 2 and FIG. 1, since it accounts for the possibility of failure of a primary broker system within the broker cluster, but still does not process data in duplicate as in FIG. 2. Combinations of the processing modes envisioned in FIGS. 1-3 and FIG. 8 (e.g. applying different processing protocols to different consumer systems of different regions) are also envisioned.

To further conserve resources and guide application of selective processing, while preserving data, it is envisioned that the continuous availability event driven application may also include a machine-learning based monitoring system. Such a system may be software executed from and stored on any of the producer system, primary broker system, or consumer system of each region, or alternately may be executed from and stored as an application 705a within a computing resource 705a within the backend platform 704 of the cloud computing environment 701, or further alternatively might be executed from and stored on a separate computing system 600. Such a system could monitor the logs of messages (recorded as described above) by the individual system, and construct a decision-making structure, such as a random forest, support vector machine (SVM), or multi-tiered neural network, in order to classify where resources are more likely to be used. This may include monitoring usage throughout the day, throughout the month, during rainy weather, sunny weather, etc. in order to train the machine learning algorithm to rank features according to classifier weights.

One example of training is the SVM, where features having the smallest weights are removed and the algorithm is re-trained with the remaining weights, wherein said process is repeated until features remain that are able to accurately separate the data into different patterns or classes. In this manner, a multi-dimensional separating hyperplane may be constructed. Alternately, a neural network type algorithm may be used, such as a back-propagation neural network, where there may be a weight matrix for each layer of the neural network, wherein for each layer a bias vector is defined. The weights are then multiplied by the input signals, and applying activation functions, the output may be calculated. Backpropagation aids in computing the error of partial derivatives, which can then be minimized across layers, and can form the central mechanism by which the neural network learns. This may aid in discovering trends for classification wherein resources of a particular system may be more likely to be used. For example, banking services may be more likely to be used closer to tax filings, or streaming services may be more likely to be used at the end of the day, when people return home.

In this manner, the machine-learning based monitoring system could monitor several variables at once for classification schemes. Several of these decision making structures may also be used in parallel to give different populations of results. Given the stochastic nature of machine-learning algorithms, a mean expected performance from two algorithms run simultaneously, may be calculated. Statistical significance tests such as a p-value or t-value test could be used for interpreting results.

Through such tests, it can be identified that an disproportionate load in terms of event processing is being put onto one system versus another. For example, if many messages are sent by the producer systems 103a and 103b at a particular time of day to primary broker system 104a, it may be possible to allocate more resources to said broker system, increase the total number of primary broker systems in the broker cluster, or take alternate remedial steps to prevent data loss, where machine-learning recognizes that at other times of data the load may not be as much, so the resources may be released during those hours. As described, the allocation of resources or load balancing may also take place in the event there are multiple heartbeat communications, and this aspect may be integrated with the processing of the machine-learning based monitoring system. As a result, from a quality design perspective, the break-even points between use of resources and prevention of data loss can be identified, which may be exploited by the administrator of the continuous availability event driven application.

Such break-even points may also be used for mode switching and load-balancing, wherein when pressure load points due to patterns of repeated use points are identified. For example, when many events are being sent to a particular region's consumer system, the machine-learning monitoring system may designate an alternate route for several events, wherein it can send a message to the respective primary broker system of a region, within the broker cluster 107, to send the event to a particular consumer system, even if not in the same region, for processing. Additionally, when a certain variable occurs such as rain, tax filing day, etc., such that the monitoring system has deemed such an occurrence is of statistical significance, then a more resource intensive, non-lean mode, such as that of FIG. 2 for critical events or FIG. 3 for events of intermediate criticality (and intermediate resource usage, as described supra) may be used. When multiple heartbeat communications are maintained for multiple regions as shown in FIG. 8, this too may put a strain on resources when many such regions are included, and the machine-learning monitoring system may designate only certain consumer systems to maintain heartbeat communication, or restrict the number of primary broker systems in cluster 107, based on predicted load. In this manner, data loss is prevented while utilizing resources in an economical manner.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Applicant rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for preventing data loss, the method comprising:
   processing, by a second consumer system, a first replica event of a first event generated by a first producer system and received from a second primary broker system, wherein the first producer system and a first consumer system belong to a first region, and wherein the second primary broker system and the second consumer system belong to a second region; and
   determining, by the second consumer system, that the first consumer system is connected to the first region and processing the first event, wherein the first replica event is ignored by the second consumer system responsive to the determining that the first consumer system is connected to the first region and processing the first event.

2. The method of claim 1, further comprising:
   processing, by the second consumer system, the first replica event in response to determining that the first consumer system is disconnected from the first region.

3. The method of claim 1, further comprising:
   detecting, by the second consumer system, an interruption in a heartbeat communication between the first consumer system and the second consumer system; and
   processing, by the second consumer system, the first replica event in response to detecting the interruption.

4. The method of claim 1, further comprising:
   in response to detecting an interruption in a heartbeat communication between the first consumer system and the second consumer system, relaying by the second consumer system, information about the interruption to the first producer system.

5. The method of claim 1, further comprising:
   processing, by the second consumer system, the first replica event in response to determining that a first primary broker system is experiencing a communication problem based on an encoded failure in the first replica event.

6. The method of claim 1, further comprising:
processing, by the second consumer system, a plurality of replica events of a plurality of events generated by a third producer system belonging to a third region and received from the second primary broker system; and
in response to determining that a third consumer system is disconnected from the third region, processing, by the second consumer system, the plurality of replica events based on load balancing information received from the first consumer system.

7. The method of claim 1, wherein:
the second primary broker system comprises a first memory and a first computer microprocessor coupled to the first memory; and
the second consumer system comprises a second memory and a second computer microprocessor coupled to the second memory.

8. The method of claim 1, wherein the first event originates from cloud computing resources of the first producer system.

9. A system comprising:
a second consumer system comprising a second memory and a second computer microprocessor coupled to the second memory, wherein the second computer microprocessor is configured to perform operations comprising:
processing, by the second consumer system, a first replica event of a first event generated by a first producer system and received from a second primary broker system, wherein the first producer system and a first consumer system belong to a first region, and wherein the second primary broker system and the second consumer system belong to a second region; and
determining, by the second consumer system, that the first consumer system is connected to the first region and processing the first event, wherein the first replica event is ignored by the second consumer system responsive to the determining that the first consumer system is connected to the first region and processing the first event.

10. The system of claim 9, the operations further comprising:
processing, by the second consumer system, the first replica event in response to determining that the first consumer system is disconnected from the first region.

11. The system of claim 9, the operations further comprising:
processing, by the second consumer system, the first replica event in response to determining that a first primary broker system is experiencing a communication problem based on an encoded failure in the first replica event.

12. The system of claim 9, wherein the operations further comprise:
processing, by the second consumer system, a plurality of replica events of a plurality of events generated by a third producer system belonging to a third region and received from the second primary broker system; and
in response to determining that a third consumer system is disconnected from the third region, processing, by the second consumer system, the plurality of replica events based on load balancing information received from the first consumer system.

13. The system of claim 9, the operations further comprising:
detecting, by the second consumer system, an interruption in a heartbeat communication between the first consumer system and the second consumer system; and
processing, by the second consumer system, the first replica event in response to detecting the interruption.

14. The system of claim 9, the operations further comprising:
in response to detecting an interruption in a heartbeat communication between the first consumer system and the second consumer system, relaying by the second consumer system, information about the interruption to the first producer system.

15. The system of claim 9, wherein the first event originates from cloud computing resources of the first producer system.

16. A non-transitory computer-readable storage device having instructions stored thereon that, when executed by at least one computing device, cause the at least one computing device to perform operations comprising:
processing, by a second consumer system, a first replica event of a first event generated by a first producer system and received from a second primary broker system, wherein the first producer system and a first consumer system belong to a first region, and wherein the second primary broker system and the second consumer system belong to a second region; and
determining, by the second consumer system, that the first consumer system is connected to the first region and processing the first event, wherein the first replica event is ignored by the second consumer system responsive to determining that the first consumer system is connected to the first region and processing the first event.

17. The non-transitory computer-readable storage device of claim 16, the operations further comprising:
processing, by the second consumer system, the first replica event in response to determining that the first consumer system is disconnected from the first region.

18. The non-transitory computer-readable storage device of claim 16, the operations further comprising:
detecting, by the second consumer system, an interruption in a heartbeat communication between the first consumer system and the second consumer system; and
processing, by the second consumer system, the first replica event in response to detecting the interruption.

19. The non-transitory computer-readable storage device of claim 16, the operations further comprising:
in response to detecting an interruption in a heartbeat communication between the first consumer system and the second consumer system, relaying by the second consumer system, information about the interruption to the first producer system.

20. The non-transitory computer-readable storage device of claim 16, wherein the first event originates from cloud computing resources of the first producer system.

* * * * *